United States Patent Office 3,337,051
Patented Aug. 22, 1967

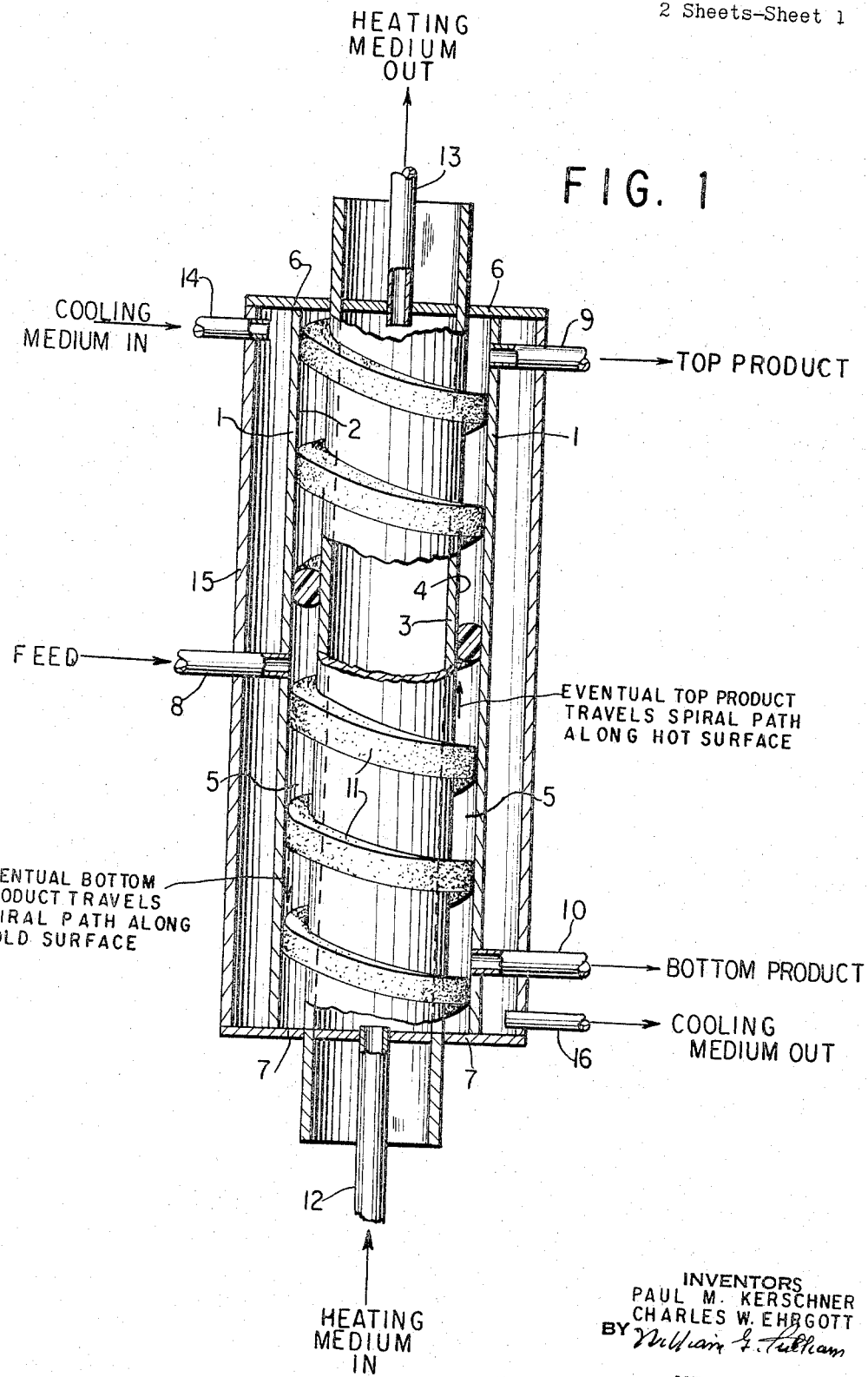

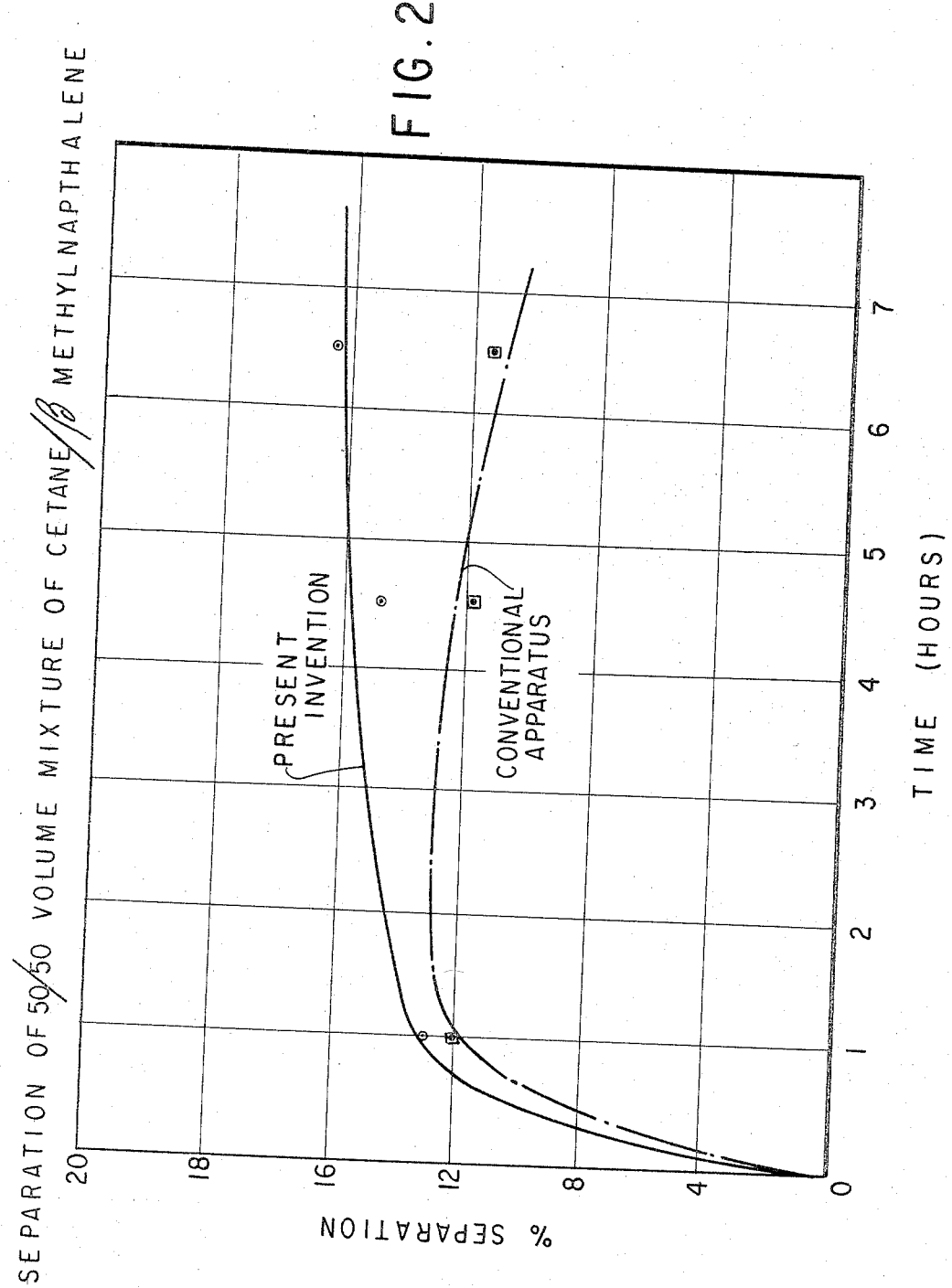

3,337,051
THERMAL DIFFUSION SEPARATOR
Paul M. Kerschner and Charles W. Ehrgott, Trenton, N.J., assignors to Cities Service Oil Company, Bartlesville, Okla., a corporation of Delaware
Filed Apr. 2, 1965, Ser. No. 445,172
10 Claims. (Cl. 210—176)

The present invention relates to novel thermal diffusion apparatus for carrying out the separation of a liquid mixture.

It has been known for some time that it is possible to separate a liquid mixture by means of thermal diffusion. Thus, for example, a liquid mixture may be completely separated into its component parts or separated into a number of dissimilar fractions, each of the fractions being enriched in one of the components of the original mixture.

One apparatus which has heretofore been used to carry out thermal diffusion comprises two substantially vertical concentric tubes, the outside diameter of one tube being almost as large as the inside diameter of the other so as to form a narrow annulus or slit of uniform width. The annulus is sealed at both of its extremities and is provided with a feed inlet port and product removal ports. When one surface bounding the annulus is heated and the other is cooled, a temperature gradient is established across the annulus. As a result of the temperature differential between the bounding surfaces of the annulus, certain species of molecules diffuse toward and concentrate along the hot surface while other species of molecules diffuse toward and concentrate along the cold surface. Furthermore, convection currents, established by the temperature differential, cause the liquid components near the hot surface to rise and the liquid components near the cold surface to flow downwardly. The product removal ports communicating with the annulus near the top and bottom thereof permit, respectively, recovery of a fraction of the original liquid mixture enriched in components that tend to diffuse toward the hot surface and recovery of a fraction of the original mixture enriched in components that tend to diffuse toward the cold surface.

The efficiency of separation by thermal diffusion apparatus of the above-noted type is effected by a number of practical operating difficulties. For instance, it is sometimes difficult to maintain the width of the diffusion annulus substantially uniform throughout its entire length. Small variations in the uniformity of the annulus width markedly decrease both the rate of separation and the degree of completeness of final separation. In addition, although the efficiency of separation may be enhanced by increasing the vertical length of the diffusion annulus, an increase in this dimension is limited by obvious practical considerations. Since there is a practical upper limit of the vertical length of the diffusion annulus, the width of the annulus must necessarily be very small, thereby restricting the throughput of feed material for a given degree of separation. Furthermore, eddy currents sometimes occur in the diffusion annulus which tend to cause the separated components of the mixture to re-mix.

It is, therefore, one object of the present invention to provide an improved liquid thermal diffusion apparatus which enables faster separation rates and more complete final separations than conventional thermal diffusion apparatus.

It is another object of the present invention to provide a liquid thermal diffusion apparatus in which the width of the diffusion annulus may be maintained substantially uniform over its entire length.

It is a further object of the invention to provide a liquid thermal diffusion apparatus which affords an increase in the effective distance from one end of the annulus to the other end without increasing the vertical length of the annulus.

It is a further object of the present invention to provide a liquid thermal diffusion apparatus wherein the temperature differential established across the diffusion annulus may be maintained substantially uniform over the length of the annulus.

It is still another object of the present invention to provide a liquid thermal diffusion apparatus wherein eddy currents which may be caused within the annulus are limited to short vertical distances.

It has now been found that these and other objects and advantages of the invention as will become apparent from the following detailed description thereof may be obtained by providing the outside surface of the inner of two concentric tubes of a thermal diffusion apparatus with a tight, spiral winding of beading of heat nonconductive, liquid impervious material, and relatively heating the inner tube while relatively cooling the outer tube to provide a temperature differential sufficient to cause the surfaces bounding the annulus to firmly contact the spiral of nonconductive beading.

The invention will now be further described with reference to the accompanying drawing in which:

FIGURE 1 is a somewhat diagrammatic sectional view of a preferred liquid thermal diffusion apparatus of the present invention, and FIGURE 2 is a plot illustrating the rate of separation of a 50/50 volume mixture of cetane/$\beta$-methylnaphthalene using the thermal diffusion apparatus of the present invention compared to the conventional concentric tube thermal diffusion apparatus noted above.

Referring to FIGURE 1, the thermal diffusion apparatus comprises a liquid impervious, vertical, hollow outer tube 1 having a smooth inside surface 2, and concentrically disposed therein, a somewhat longer liquid impervious, hollow inner tube 3 having a smooth outside surface 4. The smooth opposing surfaces 2 and 4 of the concentric tubes define a narrow longitudinally-extending annulus 5 of substantially uniform width throughout its length and closed at its upper and lower extremities 6 and 7, respectively. For optimum results, the width of the annulus 5 may range from about 0.01 to about 0.2 inch, or more, and preferably from about 0.02 to about 0.1 inch. The vertical length of the annulus is limited only by practical considerations. Communicating with the annulus 5 is an inlet port 8 for introducing in either a batchwise or continuous fashion, a liquid feed mixture to be separated. When it is desired to introduce the feed mixture at a continuous rate, the inlet port 8 is preferably positioned near the midpoint of the length of the annulus. Also communicating with the annulus 5 at different levels are product take-off ports 9 and 10. As shown in the drawing, these take-off ports may be arranged at points near the top and bottom of the annulus and on the opposite side of the annulus from the feed inlet port 8. If desired, more than two take-off ports may be provided.

The outside surface 4 of the inner concentric tube 3 is tightly wrapped with a beading of heat nonconductive, liquid impervious material to form a spiral winding 11, which should extend over at least a substantial portion of the length of the annulus 5 and preferably over the entire length of the annulus. The diameter of the spiral beading should approximate the width of the annulus so that at the operating temperatures employed the beading will be firmly held within the annulus, as will hereinafter be described.

The heat nonconductive material forming the beading should have a thermal conductivity ($k$) of less than about B.t.u./hr./sq. ft./° F./ft. and preferably less than about 20 B.t.u./hr./sq. ft./° F./ft. Representative of suitable heat nonconductive materials are beadings of glass, nylon, polyethylene, polytetrafluoroethylene, polychlorotrifluoroethylene, phenolic resins, polyesters, acrylic resins, polypropylene, polycarbonates, polyurethanes, epoxy resins, etc.

Furthermore, the turns of the spiral winding 11 should be spaced apart a substantially uniform distance throughout the length of the annulus. Preferably, the beading of heat nonconductive material spirally wound about the outside surface of the inner tube to provide at least one turn per foot of annulus length, and preferably from about two to about eight turns per foot of annulus length.

Another important consideration of the present invention is the means for establishing a temperature differential across the annulus 5. It is known that in conventional concentric tube thermal diffusion apparatus, separation efficiency is not dependent upon the direction of the temperature differential. Thus, in conventional apparatus, the outer tube may be heated and the inner tube cooled, or vice versa. However, in accordance with the present invention it is important that the inner tube be heated and the outer tube be cooled in order to obtain the benefits of the invention. Thus, as shown in the drawing, a heating medium is supplied to the interior of tube 3 through inlet 12 and removed therefrom through outlet 13, thereby heating boundary surface 4 of the annulus 5. Cooling medium is supplied through inlet 14, circulated throughout the jacket 15 surrounding the outer tube 1 and removed from the jacket through outlet 16, thereby cooling boundary surface 2 of the annulus. The tubes 3 and 1 are, respectively, heated and cooled sufficiently to cause the respective annulus boundary surfaces 4 and 2 to expand and contract and to firmly contact the spiral of non-conductive beading 11. The firm compressive fit so provided between the spiral beading and the boundary surfaces of the annulus precludes vertical channeling of the separated fractions of the feed mixture, and greatly increases the efficiency of separation. It will, of course, be understood that various other means may be employed for relatively heating the inner tube and relatively cooling the outer tube in addition to those described above.

In the operation of the thermal diffusion apparatus of the present invention, tubes 3 and 1 are relatively heated and cooled, respectively, thereby providing a firm compressive fit of the spiral beading 11 between the boundary surfaces 4 and 2 of the annulus 5, and maintaining a temperature gradient across the annulus. The temperature gradient maintained across the annulus causes the separation of the feed mixture into dissimilar fractions. Thus, one fraction containing a higher-than-initial concentration of one of the components of the feed mixture travels an ascending spiral path along the hot annulus boundary surface 4 toward top take-off port 9, while another fraction containing a higher-than-initial concentration of another of the components travels a descending spiral path along the cold annulus boundary surface 2 for the bottom take-off port 10.

If desired, a plurality of the apparatus provided by the invention may be arranged in series to take advantage of the extremely rapid initial separation rates enabled by each apparatus, thereby effecting a rapid continuous separation of a liquid feed mixture.

By using apparatus of the invention, the permissible width of the diffusion annulus may be substantially increased over that possible with conventional apparatus having a given annulus length. This is made possible by the fact that the spiral non-conductive beading within the annulus causes the molecules to ascend or descend over a helical path rather than along the shorter vertical path. Thus, the spiral beading within the annulus of the thermal diffusion apparatus of the invention enables the effective length of the annulus to be increased without changing its vertical length. Furthermore, because a larger-than-normal annulus width may be employed for an annulus of given length, the feed rate of mixture to be separated may be increased. In addition, the spiral of non-conductive beading maintains the width of the annulus substantially uniform over its entire length and does not interfere with the temperature gradient across the annulus.

In order to further illustrate the invention, a 50/50 volume blend of cetane and β-methylnaphthalene was separated in a thermal diffusion apparatus such as that shown in FIGURE 1 and in a conventional concentric tube thermal diffusion apparatus. Each diffusion apparatus was constructed of an inner copper tube having a length of 6½ feet and an outside diameter of 1.468 inches, and an outer copper tube having length of 6 feet and an inside diameter of 1.560 inches. The inner tube was concentrically disposed within the vertically arranged outer tube, and protruded therefrom a distance of about 3 inches at each end. Thus, the annulus between the tubes had a width of 0.046 inch and a length of 6 feet. Sampling tubes positioned at the top and the bottom of the annulus of each apparatus served as separated product removal parts. Prior to assembly, the outside surface of the inner tube of the diffusion apparatus of the present invention was tightly wrapped with a beading of polytetrafluoroethylene ($k=0.14$ B.t.u./hr./sq. ft./°F./ft.) having a diameter of 0.045 inch to form a spiral having about three turns per foot of annulus length.

A prepared 50/50 mixture of cetane and β-methylnaphthalene was charged in a batch-wise manner to each apparatus to fill the annulus thereof. Thereafter, a temperature differential of approximately 150° F. was established across the annulus by circulating hot oil through the inner tube to heat it to a temperature of 250° F. and passing cold water through copper coils surrounding the outside surface of the outer tube to maintain it at a temperature of 100° F. The heating and cooling of the inner and outer tubes caused them to expand and contract, respectively, and in the apparatus of the present invention, to firmly contact the spiral beading within the annulus.

The separated fractions were removed from the top and bottom removal ports of each apparatus at various intervals after start-up, and were analyzed by refractive index under sodium light. The percent separations were calculated as follows:

$$\frac{\text{RI (annulus bottom)} - \text{RI (annulus top)}}{\text{RI (β-methylnaphthalene)} - \text{RI (cetane)}} \times 100 = \text{percent separation}$$

The percent separation of the cetane/β-methylnaphthalene mixture obtained in each thermal diffusion apparatus at various time periods are tabulated below and are plotted in FIGURE 2.

| Apparatus | Time Sample Taken After Start-Up | RI bottom | RI top | Δ RI | Percent Sep. |
|---|---|---|---|---|---|
| Conventional | 1 hour | 1.5267 | 1.5070 | 0.0197 | 12.1 |
|  | 4½ hours | 1.5260 | 1.5066 | 0.0194 | 11.9 |
|  | 6½ hours | 1.5246 | 1.5058 | 0.0188 | 11.5 |
| Present Invention | 1 hour | 1.5293 | 1.5082 | 0.0211 | 12.9 |
|  | 4½ hours | 1.5315 | 1.5070 | 0.0243 | 14.9 |
|  | 6½ hours | 1.5333 | 1.5057 | 0.0276 | 16.9 |

As may be readily seen from FIGURE 2 and the above tabulation, the thermal diffusion apparatus of the present invention separated the feed mixture at a faster rate than did the conventional concentric tube thermal diffusion apparatus.

It will be understood that various changes and modifications in the details of the apparatus herein described and illustrated in order to explain the nature of the invention may be made by those skilled in the art within the principle and scope of the invention as expressed in the appended claims.

Therefore, we claim:

1. Thermal diffusion apparatus for separating a liquid mixture into dissimilar fractions comprising;

an inner, substantially vertical, liquid-impervious tube;

an outer, substantially vertical, liquid-impervious tube concentrically disposed with respect to said inner tube, the outside wall of said inner tube and the inside wall of said outer tube defining a vertically-extending annulus having a narrow, substantially uniform width and upper and lower closed extremities;

feed means communicating with said annulus to supply thereto a feed mixture to be fractionated;

a plurality of product removal ports communicating with said annulus to effect removal of dissimilar fractions of the liquid feed mixture;

a heat nonconductive, liquid impervious beading having a diameter approximately the same as the width of said annulus wound about the outside wall of said inner tube to form a spiral extending over at least a substantial portion of the length of said annulus;

means for relatively heating said inner tube and means for relatively cooling said outer tube to provide a temperature gradient across said annulus and to cause both said outside wall of said inner tube and said inside wall of said outer tube to firmly contact said heat nonconductive beading.

2. Apparatus of claim 1 wherein said heat nonconductive, liquid impervious beading is wound about the outside wall of said inner tube to form a spiral extending over the entire length of said annulus and the number of turns of the spiral per foot of annulus length is at least one.

3. Apparatus of claim 2 wherein the number of turns of the spiral per foot of annulus length is from about 2 to about 8.

4. Apparatus of claim 1 wherein the width of said annulus is within the range of from about 0.01 to about 0.2 inch.

5. Apparatus of claim 4 wherein the width of said annulus is within the range of from about 0.02 to about 0.1 inch.

6. Apparatus of claim 1 wherein said product removal ports communicate with the annulus near the upper and lower extremities thereof.

7. Apparatus of claim 6 wherein said feed means communicates with the annulus near the mid-point of its length and on the opposite side of the annulus from said product removal ports.

8. Apparatus of claim 1 wherein said spirally wound beading is formed of heat nonconductive material having a thermal conductivity of less than about 1 B.t.u./hr./sq. ft./°F./ft.

9. Apparatus claim 8 wherein said spirally wound beading is formed of heat nonconductive material having a thermal conductivity of less than about 0.2 B.t.u./hr./sq. ft./°F./ft.

10. Apparatus of claim 8 wherein said heat nonconductive material is polytetrafluorethylene.

References Cited

UNITED STATES PATENTS

| 2,541,069 | 2/1951 | Jones et al. | 210—176 |
| 2,585,244 | 2/1952 | Hanson | 55—209 X |
| 2,850,167 | 9/1958 | Fink | 210—72 X |
| 2,936,889 | 5/1960 | Henke et al. | 210—176 X |

SAMIH N. ZAHARNA, *Primary Examiner.*

C. DITLOW, *Assistant Examiner.*